(12) United States Patent
Neto

(10) Patent No.: US 8,226,040 B2
(45) Date of Patent: Jul. 24, 2012

(54) CONTINUOUS FUEL MANAGEMENT SYSTEM FOR AUTOMATIC CONTROL OF AIRCRAFT CENTER OF GRAVITY

(75) Inventor: Rubens Domecildes Neto, São Paulo (BR)

(73) Assignee: Embraer S.A., Sao Jose dos Campos - SP (BR)

( * ) Notice: Subject to any disclaimer, the term of this patent is extended or adjusted under 35 U.S.C. 154(b) by 834 days.

(21) Appl. No.: 12/197,737

(22) Filed: Aug. 25, 2008

(65) Prior Publication Data

US 2010/0044515 A1    Feb. 25, 2010

(51) Int. Cl.
*B64C 17/10* (2006.01)

(52) U.S. Cl. .................. 244/135 C; 244/135 R

(58) Field of Classification Search ........... 244/135 C, 244/135 R
See application file for complete search history.

(56) References Cited

U.S. PATENT DOCUMENTS

| | | | | |
|---|---|---|---|---|
| 2,519,968 A * | 8/1950 | Jordan | ..................... | 244/135 C |
| 2,840,097 A * | 6/1958 | Farkas | ..................... | 244/135 R |
| 2,841,164 A * | 7/1958 | Williamson | ............... | 244/135 R |
| 3,233,651 A * | 2/1966 | Smith | ....................... | 137/115.27 |
| 3,323,534 A | 6/1967 | Johnson et al. | | |
| 3,383,078 A * | 5/1968 | Shohet et al. | ............. | 244/135 R |
| 3,419,233 A * | 12/1968 | Wotton | ..................... | 244/135 R |
| 4,949,269 A * | 8/1990 | Buisson et al. | ............... | 701/124 |
| 5,321,945 A * | 6/1994 | Bell | ......................... | 244/135 C |
| 5,571,953 A * | 11/1996 | Wu | ............................. | 701/124 |
| 6,125,882 A * | 10/2000 | Kong | ........................ | 244/135 C |
| 6,126,111 A * | 10/2000 | Burcham et al. | ........... | 244/135 C |
| 6,913,228 B2 * | 7/2005 | Lee et al. | ................... | 244/135 C |
| 6,997,415 B2 * | 2/2006 | Wozniak et al. | ........... | 244/135 C |
| 7,337,795 B2 * | 3/2008 | Johnson et al. | ............ | 244/135 C |
| 7,591,277 B2 * | 9/2009 | Johnson et al. | ............ | 244/135 C |
| 2005/0051666 A1 | 3/2005 | Lee et al. | | |

OTHER PUBLICATIONS

International Search Report from corresponding PCT application WO2010/022484 (May 11, 2009).

* cited by examiner

*Primary Examiner* — Michael Carone
*Assistant Examiner* — Steven Hawk
(74) *Attorney, Agent, or Firm* — Nixon & Vanderhye P.C.

(57) ABSTRACT

Fuel transference between aircraft fuel tanks, disposed in different locations, is used to maintain the aircraft Center of Gravity close to the aft limit of the certified Center of Gravity versus weight envelope. Continuous fuel transfer decreases the control band thus enhancing aircraft performance.

20 Claims, 7 Drawing Sheets

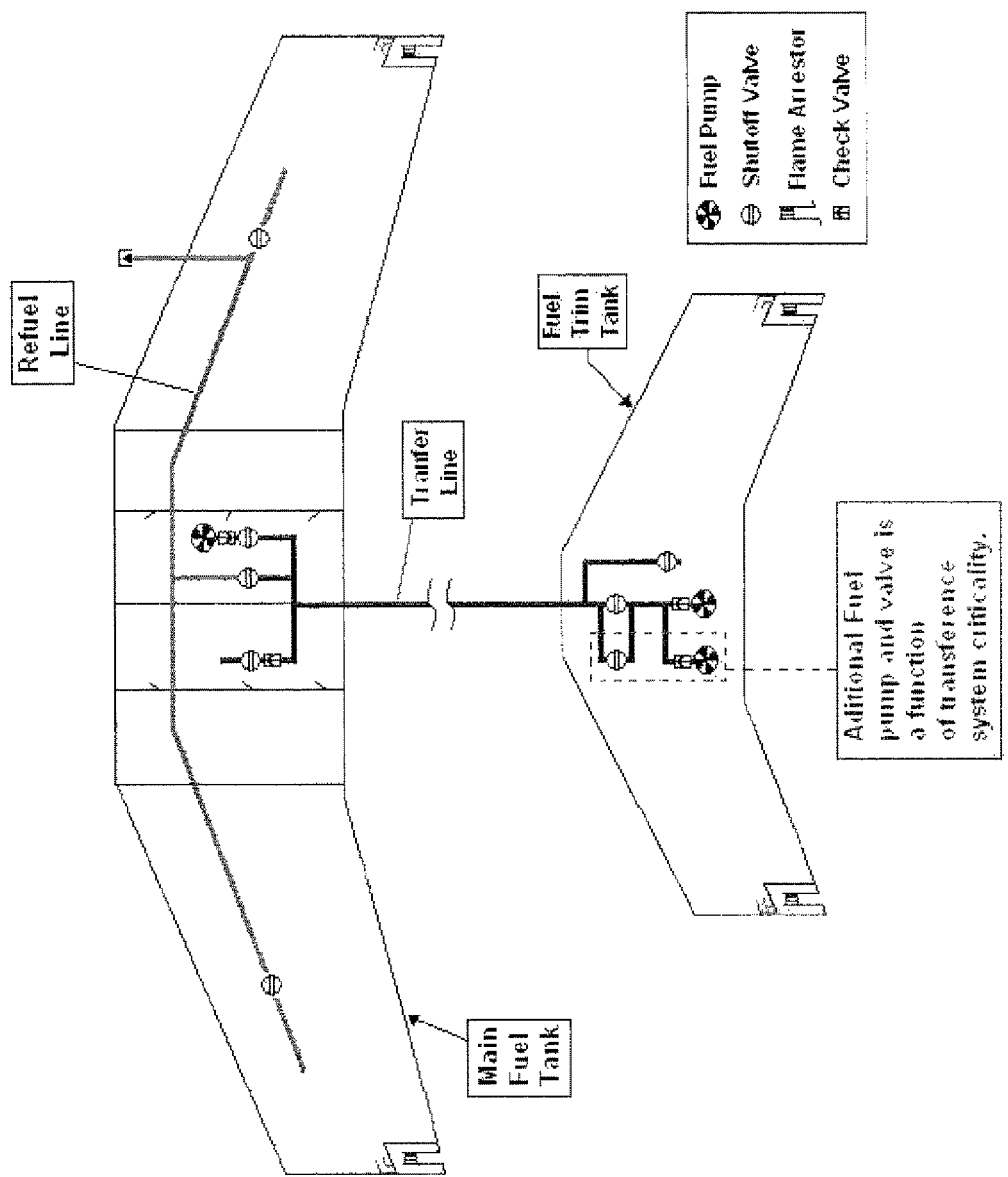
Figure 3: Exemplary Fuel Transference System

CONTINUOUS FUEL MANAGEMENT SYSTEM FOR AUTOMATIC CONTROL OF AIRCRAFT CENTER OF GRAVITY

CROSS-REFERENCES TO RELATED APPLICATIONS

N/A

STATEMENT REGARDING FEDERALLY SPONSORED RESEARCH OR DEVELOPMENT

N/A

FIELD

The technology herein relates to aircraft center of gravity optimization and weight distribution. More specifically, the technology herein relates to automatic continuous fuel transference between main and auxiliary aircraft fuel tanks to optimize center of gravity and comply with fuel regulations, and to continual transference of fuel between fuel tanks at a rate commensurate with fuel burn during cruise flight operation to maintain the aircraft center of gravity within a preselected aft center of gravity envelope.

BACKGROUND AND SUMMARY

The price of aircraft fuel has continuously increased in recent years. Nowadays, escalating fuel cost represents a big challenge to keeping commercial aviation competitive with other transportation alternatives. The aviation community therefore has been looking for ways to reduce aircraft fuel consumption.

Center of gravity optimization is one possible way to reduce fuel consumption of long range aircraft. Generally speaking, the center of gravity of an aircraft is that point from which the aircraft could be suspended (e.g., as from a cable) while remaining level. Positioning the aircraft's Center of gravity (CG) slightly aft can save fuel by reducing drag. When the aircraft center of gravity is in the aft position, the lift of the tail is less negative than a forward center of gravity due to the smaller moment arm between the lift generated by the wing and the weight. Consequently less angle of attack is necessary to create the lift necessary to offset the weight plus the less negative lift generated by the tail.

Optimum center of gravity in terms of fuel saving is obtained when the aircraft center of gravity is maintained exactly at the aft limit of the aircraft's certified center of gravity versus weight envelope ("CG Envelope"). Due to system limitations, the center of gravity generally is maintained in a region defined as a control band (i.e., a small region located nearest the aft limit of the CG envelope). The control band width is derived from the center of gravity control system characteristics.

Aircraft center of gravity is affected by a number of factors including for example location of passengers and cargo. In addition, in certain types of aircraft, fuel distribution can affect center of gravity. Some long range aircraft have auxiliary fuel tanks to increase the fuel available required to complete long range missions. The main function of the auxiliary tanks in such aircraft is to increase the fuel quantity available. However, the distribution of fuel within the different fuel tanks of a multi-tank aircraft can affect the aircraft's center of gravity and can be used to change the aircraft center of gravity position. For example, the amount of fuel in the inboard and outboard wing tanks of a sweptwing airplane affects both lateral and longitudinal balance of the aircraft. Specifically, the aircraft is tail-heavy when more fuel is within the outboard wing tanks, and nose-heavy when there is more fuel in the inboard wing tanks. For this reason, fuel-use scheduling in swept-wing aircraft operation is said to be critical. See e.g. Aircraft Weight and Balance Handbook, FAA-H-8083-1A (2007).

It is possible to schedule consumption of fuel between the main tanks and the auxiliary tanks in order to maintain proper center of gravity. During flight, the aircraft consumes fuel continuously which in turn changes the aircraft's center of gravity. The way which the center of gravity displaces as fuel is used from fuel tanks is a particular characteristic of each aircraft design.

It is also known to transfer fuel between tanks. For example, the Concorde supersonic passenger jet used a fuel management system to transfer fuel between the various tanks during flight. Such a system was used because of an aerodynamic effect that occurs around the speed of sound. At these speeds, the point where the lift acts on a wing tends to move around by a large amount. As an aircraft transitions from subsonic to supersonic speeds, the point where the lift is generated by the wing acts tends to move further back. Aerodynamicists refer to this behavior as a shift in the center of pressure, and it is caused by the creation of shock waves on the surface of the wing. The changing center of pressure has a tremendous impact on the stability and controllability of a plane. The Concorde's engineers chose to adjust the weight distribution of the plane to balance out the changes in aerodynamic lift. Their solution was to transfer fuel between different tanks to move the plane's center of gravity aft or forward. The tanks used in this process were known as "trim tanks" since their purpose was to keep Concorde in a trim condition during different phases of flight to maintain stability.

The fuel transfers on Concorde are carried out by the flight engineer from his fuel control panel. On Concorde this is one of the most important and time consuming jobs for the engineer. The panel allows the engineer to set up the transfers to be carried out automatically and stop when the relevant quantities of fuel have been moved to the correct tanks. On the other hand, the advent of computer technology, reliable software, and a desire by airlines to cut costs by reducing flight deck crew, has generally eliminated the requirement for flight engineers on modern airliners. Pilots and copilots due to the intense workload do not have the time and may not even have the expertise to finely adjust aircraft center of gravity during flight through intermittent, manually-actuated fuel transference. Nevertheless, intermittent transfer of fuel between tanks is used nowadays in some narrow body aircraft. The intermittent form is based on transference through fuel packages. The intermittent transference requires a thick control band due to booster pumps and valves that are able to transfer fuel only through a constant flow.

It would be desirable to equip an aircraft with an automatic system to detect minor changes in the aircraft center of gravity and control the continual fuel transference between tanks to maximize the time during which the center of gravity is maintained in the aft position.

It would also be desirable to provide continuous or continual transference of fuel using an integration to estimate or predict the aircraft center of gravity. Through the dynamic continuous or continual transference of fuel between tanks on board the aircraft, the aircraft center of gravity can be maintained in the optimal position during flight with minimum error.

An exemplary illustrative non-limiting system to control the fuel transference between tanks includes means to determine the fuel quantity, a method to predict the aircraft mass distribution after or during the aircraft loading; components such as plumbing, booster pumps and valves; and a controlling unit responsible to manage the distribution. The pumps may provide continuously-variable flow rate control so that the pumps remain on while providing a controllable flow rate from zero to a predetermined maximum.

Continuous transference makes use of a more sophisticated control system to monitor fuel usage and dynamically transfers fuel between tanks based on prediction or estimation. Continuous transference of fuel can be provided through a variable flow that is managed by a highly integrated system that includes electronic operated pumps or valves, a Center of Gravity Estimation Box, and several sensors to estimate the mass distribution in the aircraft. The continuous form can operate in a reduced control band due to the capacity to transfer fuel continually exactly in the quantity necessary to maintain the center of gravity close to the envelope aft limit while taking fuel burn rate into account.

Continuous transference provides certain technical advantages when compared to the intermittent transference such as reduced component cycling (which can provide extended component life) and an optimized after center of gravity due to the reduced band control thickness.

In one exemplary illustrative non-limiting implementation, the control system transfers fuel from the main tanks to the auxiliary tanks at the beginning of the flight to maintain optimum center of gravity during flight. In advance of landing, the control system transfers sufficient fuel from the auxiliary tanks back to the main tanks (or ceases to transfer additional fuel from the main tanks when the amount of fuel the main tanks contain reaches a predetermined lower limit) to comply with flight regulations (e.g., requiring sufficient fuel in the main tanks during landing to allow alternate landing procedures).

Additional non-limiting exemplary features and advantages include:
  An Active Center of Gravity Control System with continuous or continual fuel transference logic
  Center of Gravity Estimation Box (CGEB) that receives and processes signals from sensors and inputs
  A CGEB that converts information in terms of center of gravity to fuel flow required to be transferred between fuel tanks
  A fuel transfer system, comprised of pumps and/or valves, able to modulate the fuel flow according to the output of the CGEB to take the aircraft CG to the optimum position and maintain it there
  A plurality of fuel tanks disposed in different zones of the aircraft with communicating fuel lines able to transfer fuel between the tanks according to the CGEB.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 3 is a schematic illustration of an exemplary non-limiting fuel transference system for an illustrative aircraft;

DETAILED DESCRIPTION

Figure 1:
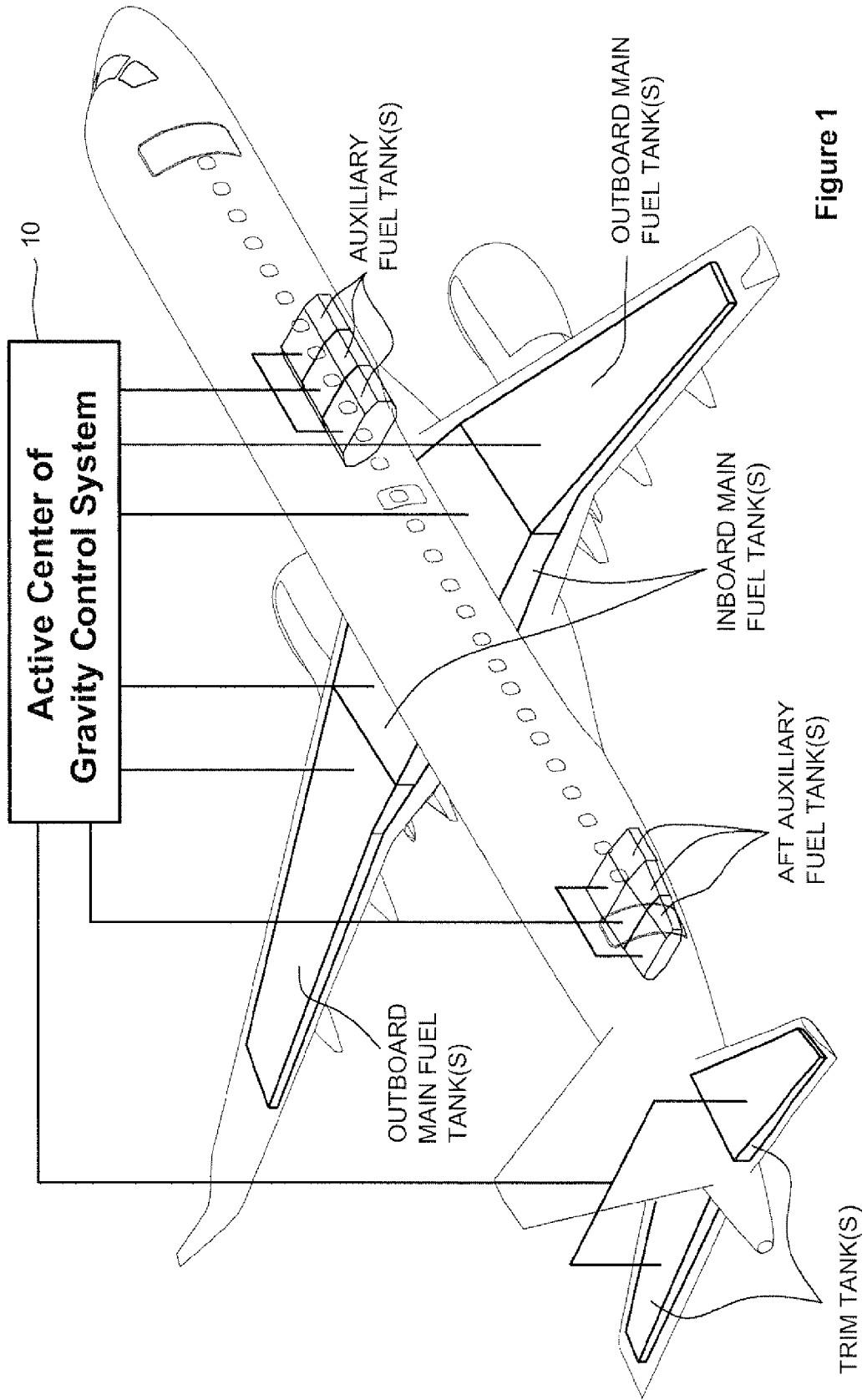
FIG. 1 is a schematic illustration of an exemplary non-limiting aircraft showing example fuel tank locations.
Figure 2:
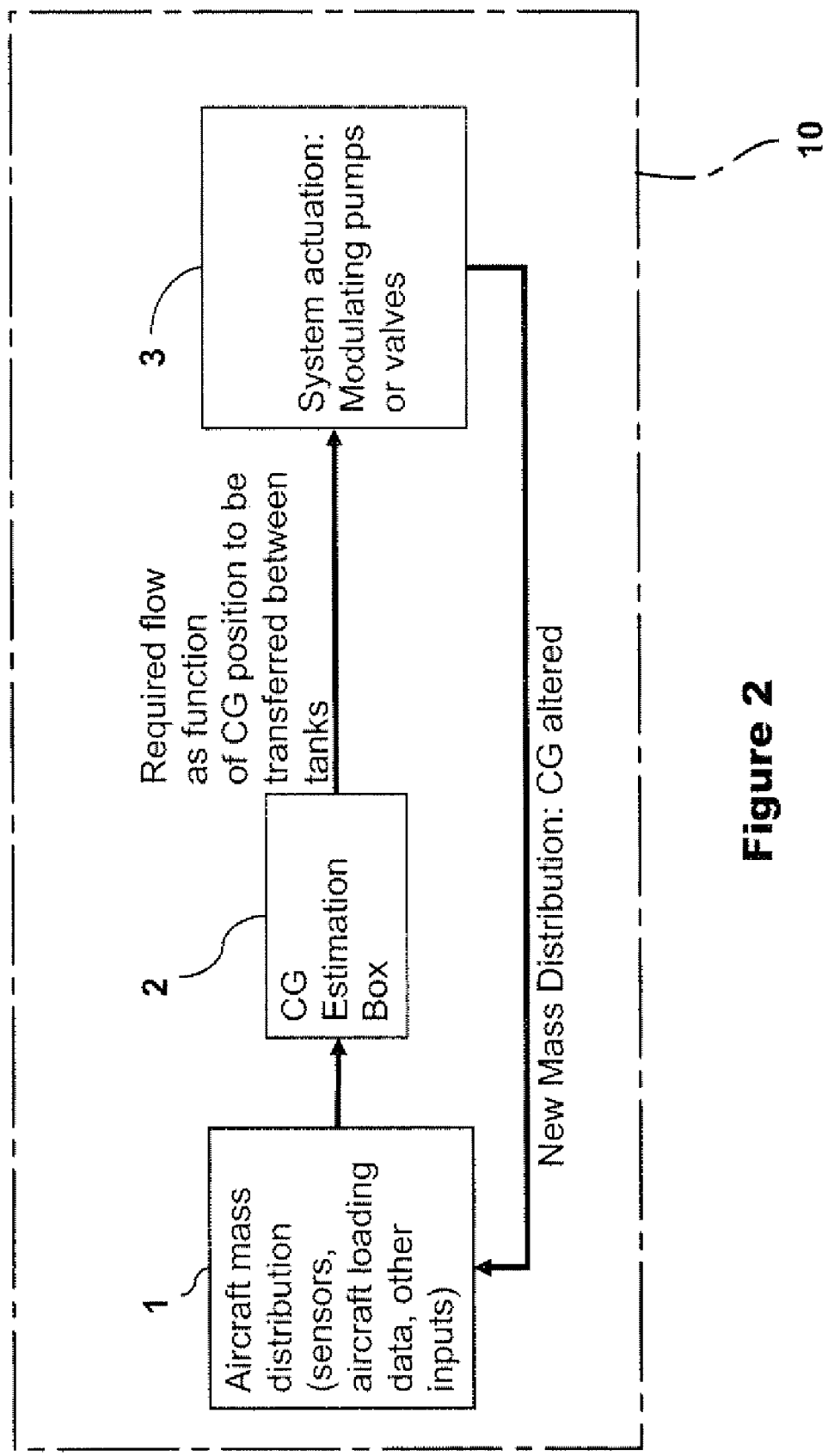
FIG. 2 is a schematic diagram showing a control system that automatically, continually transfers fuel between aircraft fuel tanks to optimize aircraft center of gravity.

The exemplary illustrative non-limiting implementation of a continuous fuel management system 10 is depicted schematically in FIG. 1 with reference to an illustrative aircraft. As shown, the continuous fuel management system 10 transfers fuel through a variable flow that is managed by a highly integrated system. FIG. 2 shows an exemplary non-limiting implementation or embodiment of such a control system 10 that includes electronic operated pumps or valves 3, a Center of Gravity Estimation Box 2, and one or more sensors 1 to estimate mass distribution in the aircraft. As will be explained, this exemplary illustrative non-limiting continuous fuel management system can operate in a reduced control band due to the capacity to transfer fuel continually exactly in the quantity necessary to maintain the center of gravity close to the envelope aft limit.

The Center of Gravity Estimation Box 2 is responsible to process and predict changes in the aircraft center of gravity. The Center of Gravity Estimation Box 2 receives information about engine consumption, fuel quantity and gauging system, aircraft payload loading and distribution, fuel pump flow, and other information from sensors 1 and processes this information to determine actual center of gravity position of the aircraft.

Exemplary Illustrative Non-Limiting Fuel System

FIGS. 1 and 3 together show an exemplary illustrative non-limiting fuel system for use as part of an automatic system to control the aircraft center of gravity. As shown in FIG. 1, an exemplary aircraft has main inboard and outboard tanks and auxiliary tanks including trim tanks. The main inboard and outboard tanks can be located for example within the two wings. Auxiliary tanks can be located within fore and/or aft fuselage regions and/or within the aircraft's horizontal or vertical stabilizers near the aft section of the aircraft (e.g., by way of one or more aft-located auxiliary tanks). Auxiliary tanks used to control the aircraft CG are considered trim tanks, generally tanks located in aircraft's horizontal and/or vertical stabilizers are commonly denominated trim tanks but fuselage tanks can be also denominated trim tanks when contribute to adjust the aircraft CG. In some exemplary illustrative non-limiting implementations, the auxiliary tanks are located strategically in order to provide better continuous control over and optimization of center of gravity. It will be understood that a particular aircraft that embodies the system 10 need not be equipped with all of the fuel tanks shown in FIG. 1 so any desired combination of fuel tanks and their locations may be satisfactorily be employed.

FIG. 3 shows an exemplary fuel transference system that is integrated with the FIG. 1 fuel tanks. Fuel pumps and valves are provided to transfer fuel in either direction i.e., from a main tank to an auxiliary tank or from an auxiliary tank to a main tank. In the exemplary illustrative non-limiting implementation, these fuel pumps are capable of being modulated to provide variable flow rates that can be continuously controlled and substantially continuously maintained. There are two interesting aspects to such fuel pump control. The first is the ability of the exemplary illustrative non-limiting implementation to continuously vary flow rate between zero flow rate and a predetermined maximum flow rate. In one exemplary illustrative implementation, FIG. 2 block 3 is capable of producing for example a pulse width or other modulated signal that when applied to an actuator such as a pump or valve results in a controlled fuel flow rate. Thus, in this exemplary illustrative non-limiting implementation, the pump or valve is not simply "on" or "off" but rather can be controlled to provide a flow rate that can be set, increased or decreased. The other aspect is that in view of the continuously variable flow rate feature, the pump or valve used to transfer fuel can be actuated continually or substantially continually to provide an essentially constant, controlled flow rate of fuel transference from one aircraft tank to another. Of course, the fuel pump may be turned off from time to time e.g. during periods when no fuel transference is desired. While continual fuel flow at a variable rate is desirable, other exemplary illustrative non-limiting implementations may cycle fuel pumps on and off on an as-needed basis to effect dynamic redistribution of fuel between tanks.

The overall system is preferably designed in order to manage the fuel in the aircraft and also to cope with failures that could jeopardize the aircraft safety during the take-off, continuous flight and landing. The reliability of the whole fuel system, i.e. components plus the Fuel Control Unit, is a function of the aircraft criticality regarding fuel system, structural behavior and flying qualities.

Auxiliary tank(s) can be used to store fuel in the aircraft, increasing its range capability and/or adjust the aircraft CG. Auxiliary tanks may thus also serve as trim tanks when they are used to control the aircraft CG.

The basic fuel system for an auxiliary tank may be comprised of fuel pumps, isolation valves, check valves and control valves. During the aircraft refueling operation, if necessary the fuel can be transferred to the auxiliary tank by the fuel pumps or by a derivation in the refueling line. The quantity of fuel transferred to the auxiliary tanks during the refueling operation is controlled by the center of gravity control system. The transference from an auxiliary tank to wing tank during the flight is effectuated by pumps and in case of emergency can be effectuated by gravity. The exemplary illustrative non-limiting implementation shown in FIG. 3 provides controlled bidirectional transference of fuel between tanks so that for example fuel can be transferred from a main tank to an auxiliary or trim tank, or from an auxiliary or trim tank to a main tank. In some exemplary illustrative non-limiting implementations, fuel can also be transferred from one main tank to another main tank. Thus, the system is capable of transferring and redistributing fuel throughout the fuel tank system on board the aircraft to dynamically change and determine aircraft center of gravity. Redundant or backup fuel pumps and/or valves may be provided as desired to provide fault tolerance and/or selectively increased flow rate.

The fuel line to transfer fuel from the auxiliary tank to the wing may be completely independent or a derivation of the wing tank refuel line. For the both options is desirable to provide that the center of gravity control system will have the authority to determine the quantity of fuel that will be transferred to the auxiliary tank. Only in case of system fault the crew will be able to deactivate the center of gravity control system and isolate the auxiliary fuel tank use until a system maintenance. The derivation of the APU (Auxiliary Power Unit) feed line as also a transference line between the auxiliary and main tanks is not recommended due to the APU fuel consumption that affect the center of gravity control and pumps operation, is recommended to the APU a independent fuel feed line.

The Fuel Control Unit is responsible to control the automatic fuel transference and the fuel gauging system in the aircraft fuel tank(s). An override is provided to allow the flight crew to selectively disengage the FCU and control manually the transference from the auxiliary tank to wing tank.

Figure 4A:
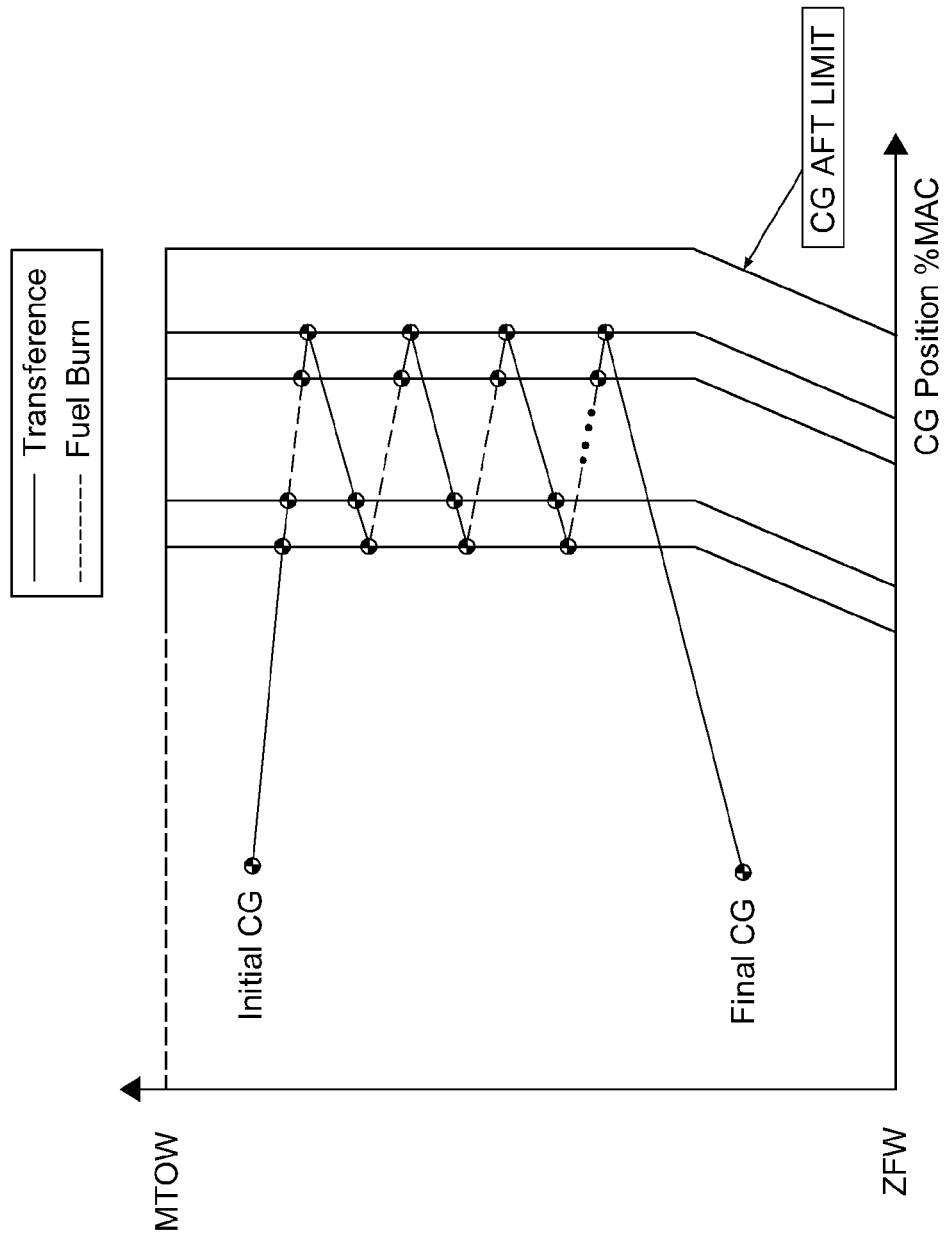
FIG. 4A is a graph of prior art intermittent fuel transference results.
Figure 4B:
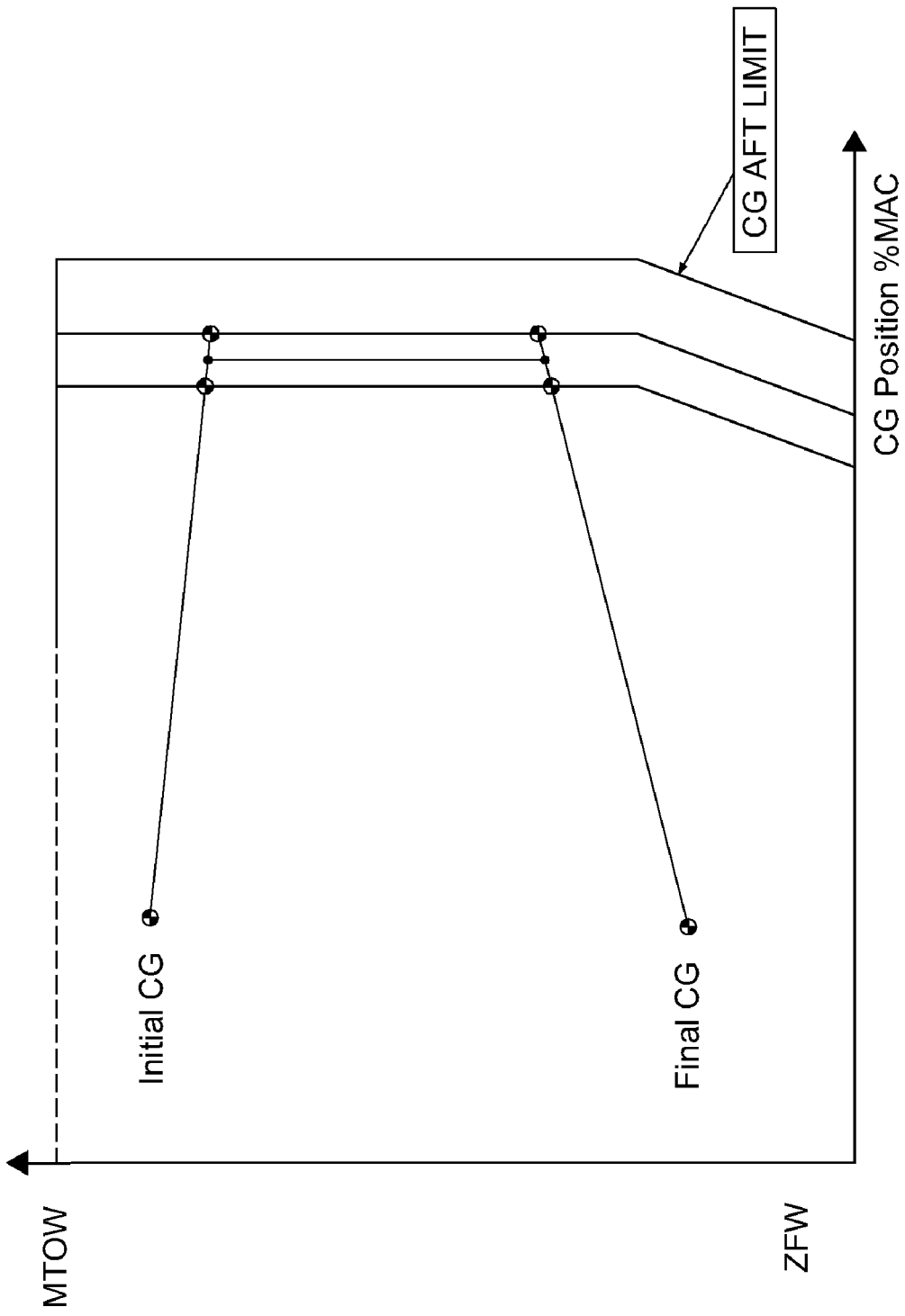
FIG. 4B is a graph of an exemplary illustrative non-limiting CG optimization through continuous transference of fuel between a wing tank and a tank positioned in the empennage.

FIGS. 4A and 4B show exemplary illustrative fuel transference for the intermittent and continuous cases, respectively. In both cases, the aircraft's center of gravity begins and ends in non-optimal set points to comply with fuel regulations of the Federal Aviation Administration. More specifically, non-optimal set points in the CG envelope are a result of regulations that require sufficient volume of fuel in the main tanks during takeoff and landing such that the aircraft would have a sufficient quantity of fuel available in the main tanks to make alternative maneuvers (e.g., to enable sufficient fuel in the main tanks to allow the aircraft to fly to a pre-planned alternate destination airport and land should weather prevent landing at the primary destination airport).

FIG. 4B is a graph illustrating an example of CG optimization through the continuous transference between a wing tank and a trim tank. In this example, the center of gravity is positioned initially in the middle of the certified envelope. When the center of gravity control system starts the operation, the fuel is transferred and the aircraft center of gravity is displaced to the aft position to provide the maximum fuel savings without affecting safety. In this embodiment, the center of gravity stays relatively constant during flight even though the aircraft is constantly consuming fuel. This substantially constant in-flight CG is due to the ability of the exemplary system continually or continuously transferring fuel in a calculated or estimated amount during flight so that an optimum center of gravity is always maintained. In contrast, the FIG. 4A graph relating to intermittent control shows cycling or hysteresis of center of gravity within an acceptable CG envelope.

When the aircraft is ending the mission (depending on the particular aircraft design), the fuel remaining in the tanks can cause a minor effect in the aircraft Center of Gravity. From this moment, the fuel can be completely transferred to the main wing tanks and the center of gravity control system can become dormant.

Figure 5:
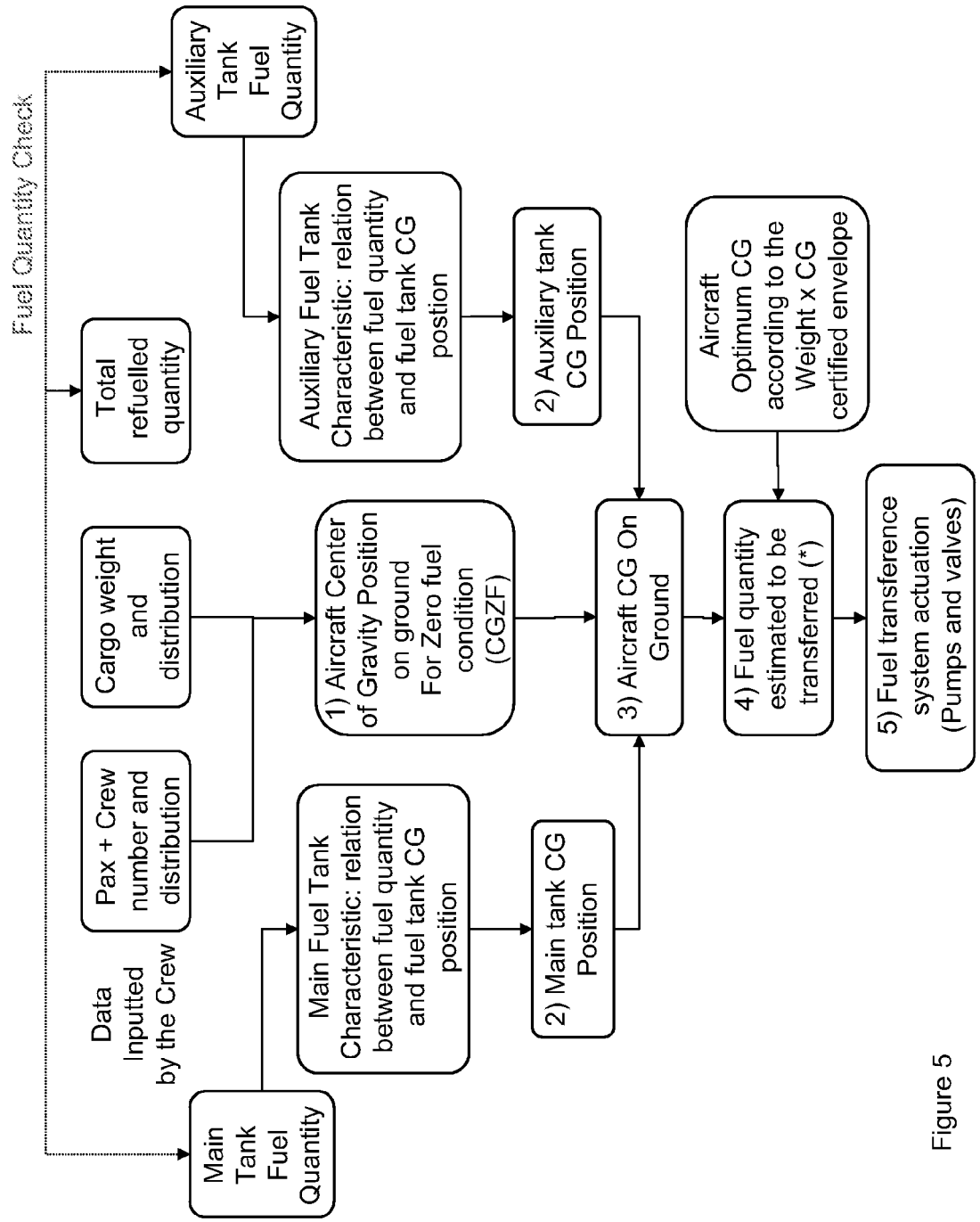
FIG. 5 is a flowchart of exemplary illustrative non-limiting control steps for preparing for continuous fuel transference during an initial flight stage before takeoff.

FIG. 5 is a flowchart of exemplary illustrative non-limiting steps that can be used to implement the system of FIG. 2. In this control algorithm, the fuel quantity estimated to be transferred between the fuel tanks depends on the fuel tank characteristics (relation between fuel quantity and fuel tank CG position). The crew and ground operational personal input the following data in the CG control system interface avionics:

Number and distribution of passengers ("pax") and crew
Cargo weight and distribution
Total refueled quantity.

Using this inputted data, the computer estimates the aircraft center of gravity on ground (CGZF), considering the payload and the aircraft platform CG with exception the fuel loaded. The quantity of fuel that is distributed between the fuel tanks during the refueling operation is determined by the fuel control unit and varies according to the refueled quantity. With the fuel tank quantity the system can determine the fuel tank CG position. The fuel quantity measured by the FQGS is confirmed by the fuel information inputted by the crew/ground operation personnel to guarantee that the quantity is correct and the FQGS is operating correctly.

With the CGZF and the fuel tanks' CG position defined, the system can determine the aircraft center of gravity on the ground. After the Aircraft center of gravity estimation on the ground is determined, the CG control system can adjust the fuel transference between the tanks to optimize the aircraft CG position according to the weight and CG envelope (ground operations and take-off conditions should both be respected). The fuel quantity estimated to be transferred between the fuel tanks depends on the fuel tank characteristics (relation between fuel quantity and fuel tank CG position).

Figure 6:
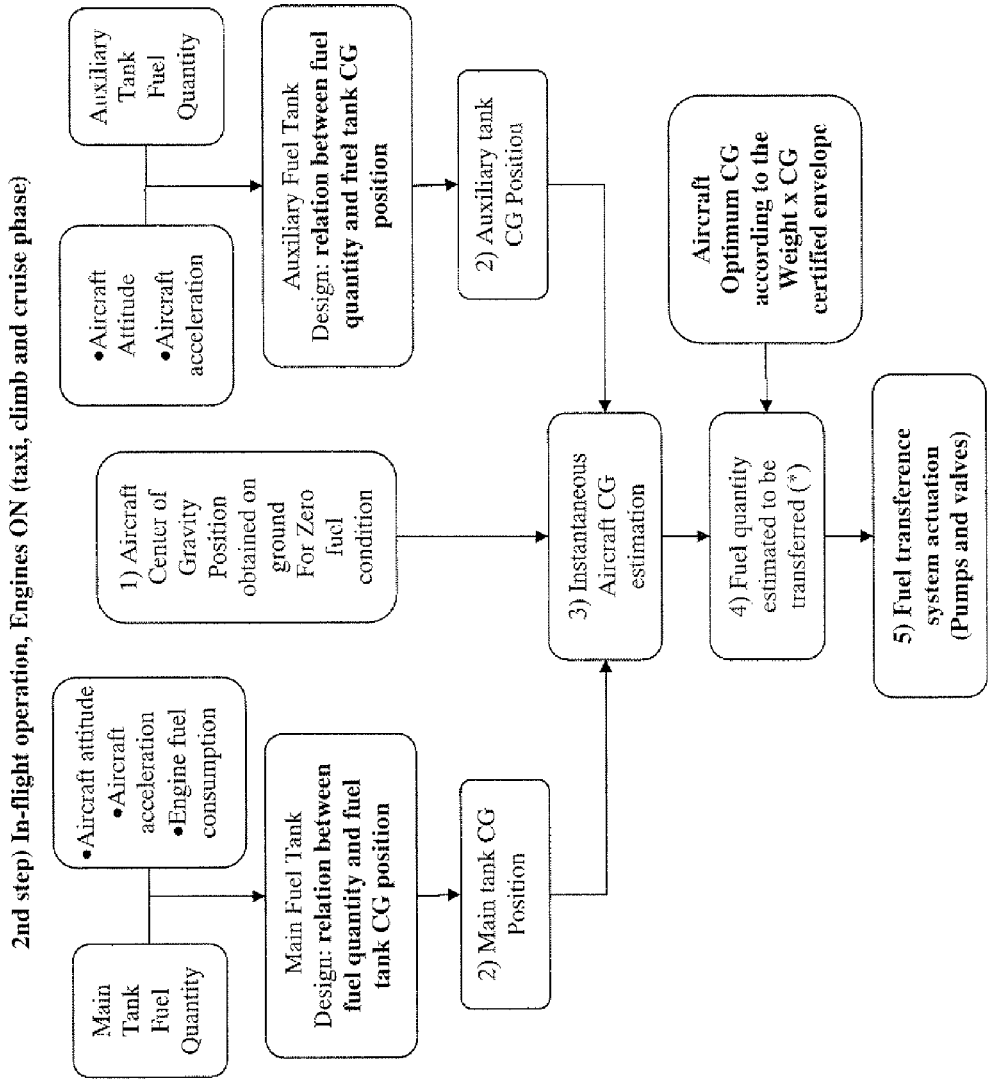
FIG. 6 is a flowchart of exemplary illustrative non-limiting control steps for providing continuous fuel transference to optimize center of gravity while the aircraft is in the air.

FIG. 6 illustrates the center of gravity operation during the flight, basically the aircraft center of gravity obtained on the ground for zero fuel condition (CGZF), considering the payload and the aircraft platform CG with exception the fuel quantity, is maintained the same during all flight except for the aircraft used for skydiving or for cargo parachute extraction. As fuel in the main tank is consumed by the engines, and the fuel tank center of gravity start to change, the changes in the tank fuel quantity are detected by the FQGS (Fuel quantity gauging system) and also by the difference between the total fuel loaded on ground and the total engine fuel burned. According to the changes in the tank fuel quantity, the system can determine the new fuel tank CG position according to the tank design characteristics. The auxiliary tank fuel quantity is obtained by the FQGS and by the fuel transferred between the tanks and its CG can be determined through the same process.

Significant aircraft accelerations can affect fuel tank CG. Consequently an instantaneous actuation of the system to control the CG can be used to guarantee that the aircraft certified weight and CG envelope will be respected. With CGZF and the new fuel tank CG positions, it is possible to determine the instantaneous aircraft center of gravity position during the flight. After the Aircraft center of gravity estimation, the CG control system can determine/estimate the fuel necessary to be transferred continuously between the tanks to maintain the aircraft CG position optimized according to the weight×CG envelope. The center of gravity system continues executing the steps shown during the entire flight until the 3rd step condition is detected. The $3^{rd}$ step (In-flight operation, end of cruise, descent, landing phase) means that landing is about to take place. The 3rd step starts in the end of cruise phase when the fuel quantity in the main fuel tanks reaches a minimum quantity that can not be transferred from the main tanks due to safety requirements (NBAA IFR Fuel Reserves, that is sufficient fuel for the aircraft to miss an approach at the primary destination airport, climb to holding altitude of 500 feet and hold for five minutes, fly to and land an a pre-planned alternate airport within a 200 NM range of the primary airport, plus sufficient fuel to hold at an altitude of 5000 feet for 30 minutes.) Once this condition is reached, the fuel contained in the auxiliary tanks must be transferred to the main tanks and the center of gravity control system is ceases to effect fuel transference.

Another reason to disable the center of gravity system near the end of flight is that the remaining quantity of fuel near the end of flight is reduced to a quantity that influences due to the fuel tank center of gravity in the aircraft CG become so small that it does not justify that the system 10 continues to operate continually. If the quantity of fuel is maintained in the acceptable limits to justify the system operation and respecting the reserves requirements, the system can continue to remain operational in the end of flight phases but the aircraft weight× CG envelope will be respected.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

I claim:

1. On an aircraft, an onboard active center of gravity control system with continuous fuel transference between fuel tanks, comprising:
at least one variable flow control element that is fluid-coupled between said fuel tanks, said flow control element capable of providing a variable flow rate of fuel between said fuel tanks; and
an electronic controller coupled to electronically control said at least one flow control element, said electronic controller dynamically controlling said variable flow rate of fuel transfer between said fuel tanks to optimize aircraft center of gravity.

2. The system of claim 1 wherein said electronic controller provides continual transference of fuel between said fuel tanks at a rate commensurate with fuel burn during cruise flight operation to maintain the aircraft center of gravity within a pre-selected aft center of gravity envelope.

3. The system of claim 1 further including sensors that sense aircraft mass distribution, and wherein said electronic controller is coupled to said sensors and estimates the aircraft center of gravity at least in part in response to said sensed aircraft mass distribution.

4. The system of claim 1 wherein said electronic controller accesses data indicating distribution of fuel and non-fuel mass on the aircraft.

5. The system of claim 1 wherein said electronic controller schedules end-of-flight fuel transference to ensure that a main tank fuel content complies with fuel regulations for landing.

6. The system of claim 1 wherein said electronic controller controls said flow control element to remain on continually.

7. The system of claim 1 wherein said electronic controller selectively deactuates said flow control element.

8. The system of claim 1 wherein said electronic controller includes a Center of Gravity Estimation Box (CGEB) that receives and processes signals from sensors and inputs to provide output, said CGEB converting information in terms of aircraft center of gravity to the variable flow rate of fuel required to be transferred between fuel tanks continually.

9. The system of claim 8 wherein said flow control element comprises pumps and/or valves able to modulate the variable flow rate of fuel according to the CGEB output to take the aircraft center of gravity to an optimum position.

10. The system of claim 1 further including a plurality of fuel tanks disposed in different zones of the aircraft with communicating fuel lines able to transfer fuel between the plurality of fuel tanks.

11. A method of providing continual transference of fuel between fuel tanks on board an aircraft at a rate commensurate with fuel burn during cruise flight operation, said method comprising:
sensing at least one flight parameter;
estimating current aircraft center of gravity at least in part in response to said sensed flight parameter and stored data; and
in response to said estimating, automatically actuating a variable flow element that is fluid-coupled between a main tank and an auxiliary tank to maintain the current aircraft center of gravity within a pre-selected aft center of gravity envelope during flight.

12. The method of claim 11 further wherein said sensing includes sensing aircraft mass distribution, and said estimating comprises estimating the current aircraft center of gravity at least in part in response to said sensed aircraft mass distribution.

13. The method of claim 11 wherein said stored data indicates distribution of fuel and non-fuel mass on the aircraft.

14. The method of claim 11 further including scheduling end-of-flight fuel transference to ensure main tank fuel content complies with fuel regulations for landing.

15. The method of claim 11 further includes controlling said variable flow element to remain on continually.

16. The method of claim 11 further including selectively deactuating said variable flow element.

17. The method of claim 11 further including converting information representing aircraft center of gravity to fuel flow required to be shifted between the main and auxiliary fuel tanks.

18. The method of claim 17 further including modulating fuel flow to take the current aircraft center of gravity to an optimum position.

19. The method of claim 11 further including bidirectionally transferring fuel between a plurality of fuel tanks disposed in different zones of the aircraft.

20. A system for providing continual transference of fuel between fuel tanks on board an aircraft at a rate commensurate with fuel burn during cruise flight operation, said system comprising:
   means for sensing at least one flight parameter;
   means for estimating current aircraft center of gravity at least in part in response to said sensed flight parameter and stored data; and
   means responsive to said estimating for automatically actuating a variable flow element between a main tank and an auxiliary tank to shift fuel between the main tank and the auxiliary tank and thereby maintain aircraft center of gravity within a pre-selected aft center of gravity envelope during flight.

* * * * *